METHOD OF SEALING AND EVACUATING VACUUM ENVELOPES

Original Filed Sept. 30, 1969 3 Sheets-Sheet 1

INVENTOR
Albert Bereza
BY
Willard R. Croft
ATTORNEY

METHOD OF SEALING AND EVACUATING VACUUM ENVELOPES

Original Filed Sept. 30, 1969 3 Sheets-Sheet 2

METHOD OF SEALING AND EVACUATING VACUUM ENVELOPES

Original Filed Sept. 30, 1969 3 Sheets-Sheet 3

United States Patent Office

Re. 27,733
Reissued Aug. 14, 1973

27,733
METHOD OF SEALING AND EVACUATING VACUUM ENVELOPES

Albert Bereza, Elmira, N.Y., assignor to Westinghouse Electric Corporation, Pittsburgh, Pa.

Original No. 3,656,225, dated Apr. 18, 1972, Ser. No. 862,401, Sept. 30, 1969. Application for reissue Oct. 13, 1972, Ser. No. 297,527
Int. Cl. B23k *31/02*
U.S. Cl. 29—472.7 8 Claims

Matter enclosed in heavy brackets [ ] appears in the original patent but forms no part of this reissue specification; matter printed in italics indicates the additions made by reissue.

ABSTRACT OF THE DISCLOSURE

The two insulating casings of a vacuum envelope are placed in close proximity, and a plurality of spaced U-shaped brazing shims are disposed in spaced relation around an annular brazing shim, the latter being positioned between the confronting ends of the two ceramic, or insulating rings constituting the envelope of the enclosure. The envelope is placed within a vacuum furnace and heated to a temperature just below the melting temperature of the U-shaped brazing shims. In effect, this creates a peripheral opening permitting thereby a communicating passage between the interior and the exterior of the envelope for outgassing procedures.

When the desired degree of outgassing and evacuation has occurred, the temperature of the vacuum furnace is raised to the melting point of the plurality of spaced brazing shims, and they melt flowing into the space between the two ceramic or insulating casings, and sealing the same together. No tubulation is needed with this method.

CROSS-REFERENCES TO RELATED APPLICATIONS

Applicant is not aware of any related application pertinent to the present invention.

BACKGROUND OF THE INVENTION

The present invention relates to the art of outgassing, evacuating, and sealing envelopes, which constitute vacuum tubes, vacuum-type circuit interrupters, and other vacuum devices. A presently-used method for evacuating and sealing vacuum tubes and other vacuum envelopes involves an open tubulation connected to the tube envelope. At the proper time in the process of making the vacuum tube, after the gases in the tube enclosure have been exhausted through the tubulation, the tubulation is sealed off. A portion of the tubulation between the seal and the envelope projects from the tube envelope. Furthermore, this tubulation is a weak, or vulnerable part of the tube envelope. In many forms of vacuum tubes, and particularly in cathode-ray tubes, the tubulation is positioned in the middle of the stem of the tubes within the circular array of base pins. In vacuum-type circuit interrupters, the tubulation generally projects from one of the end caps of the device, and needs protection.

In the presently-used method of evacuating a cathode-ray tube, involving a tubulation, the tube is evacuated in an evacuation oven under proper temperature conditions for this purpose. It is inconvenient to seal the tubulation while the tube is in the oven: therefore, when the tube has been evacuated, it is removed from the oven during the sealing-off process. At that time, at least a portion of the tube envelope is exposed to lower-than-evacuation temperatures, resulting in concomitant chance of implosion, or cracking of the tube envelope, during the sealing-off operation.

In addition to the foregoing disadvantages, the presently-used evacuation method requires provision of the tubulation, which involves supplying material in addition to the material used in the tube envelope.

SUMMARY OF THE INVENTION

The present invention is particularly concerned with the evacuation and sealing-off of vacuum envelopes while in the vacuum furnace. According to a preferred embodiment of the present invention, there is provided a plurality of spaced brazing shims, which may be manually wrapped around a portion of an annular ring-type brazing seal, and this provides a peripheral clearance between the two confronting edges of the ceramic casings. In other words, a communicating passage is provided peripherally around the envelope, so that ready egress of gases may occur, passing outwardly into the vacuum furnace to be drawn off by the vacuum-creating equipment.

According to the preferred process of the present invention, the provision of the spaced brazing shims provides such clearance, and the temperature of the vacuum furnace is maintained just below that necessary to melt the brazing shims.

At the desired point in the outgassing and evacuation process, the temperature of the vacuum furnace is raised quickly to a point above the melting point of the brazing shims, which action causes them to melt, and to flow between the conjointly disposed end faces of the ceramic, or insulating casings. This provides, in one operation, a tight seal between the confronting ends of the insulating casings.

The temperature of the vacuum furnace may then be gradually reduced in steps to anneal the casing walls and gradually reduce the temperature of the component parts of ambient temperature.

It is, accordingly, a general object of the present invention to provide means for a method of evacuating and sealing a vacuum device, or envelope not having the disadvantages of the presently-used evacuating and sealing operation involving a tubulation.

It is a further object of the present invention to provide a means for, and a method of evacuating and sealing, which results in an enclosure having a shorter overall length than the presently-used envelopes due to the omission of the tubulation.

It is a further object of the present invention to facilitate evacuating an enclosure by providing an evacuation path through the tube envelope having a larger diameter, and a shorter length than that possible using the tubulation method of evacuating and sealing.

It is a further object of the present invention to present less chance than heretofore of implosion or cracking of the tube envelope while sealing.

Further objects and advantages will readily become apparent upon reading the following specification taken in conjunction with the drawings.

DESCRIPTION OF THE PREFERRED EMBODIMENT

Figure 1:
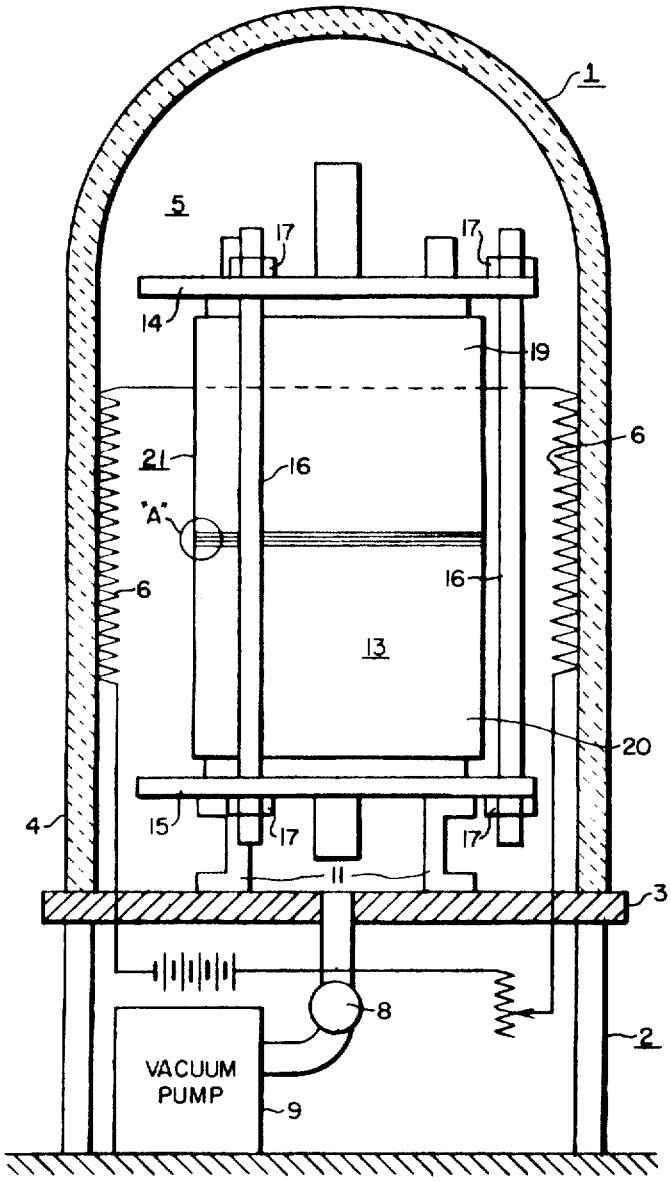
FIG. 1 is a vertical sectional view taken through a vacuum furnace, illustrating a vacuum-type circuit interrupter being evacuated and sealed in accordance with the method of the present invention.

Referring to the drawings, and more particularly to FIG. 1 thereof, the reference numeral 1 generally designates a vacuum furnace, as customarily utilized in the evacuation and sealing of vacuum-type devices, such as tubes, cathode-ray tubes, circuit-breaker envelopes, gas discharge tubes and the like. As well known by those skilled in the art, generally the vacuum furnace 1 comprises an upstanding support 2 which supports an upper platform 3 and enclosure 4, the latter enclosing a space 5 which may be heated to any desired temperature by resistance means, such as designated by the reference numeral 6, and being connected by suitable valve means 8 to a vacuum pump 9.

The representation, as set forth in FIG. 1, is somewhat diagrammatic, inasmuch as the vacuum furnace 1 is well recognized and understood by those skilled in the art.

Figure 3:
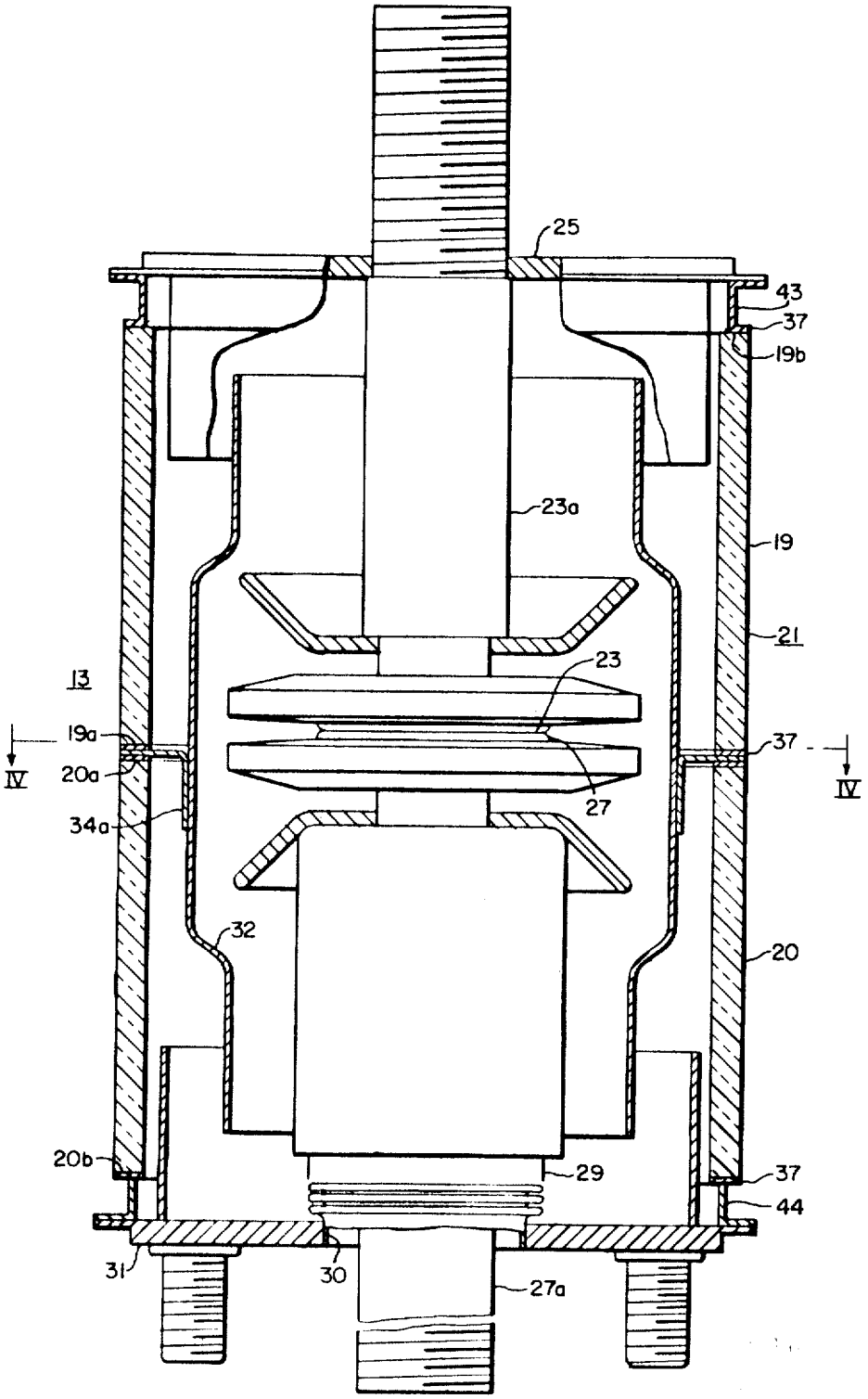
FIG. 3 is a considerably-enlarged vertical sectional view taken through the vacuum-type circuit interrupter of FIG. 1, illustrating the component parts interiorly thereof following the sealing operation.

Supported in an upstanding relationship upon a pair of spaced support members 11 is a vacuum-type circuit interrupter device 13 clamped between a pair of metallic end plates 14, 15 by a plurality of clamping rods 16, each of which has clamping nuts 17 threaded thereto. Preferably, the clamping rods 16 are made of molybdenum, which has a coefficient of thermal expansion less than that of the two ceramic sleeves 19, 20 which generally constitute the evacuated envelope 21 of the vacuum-type circuit interrupter 13. FIG. 3 may be referred to in connection with the general type of device 13 involved.

With reference to FIG. 3, it will be noted that a vacuum-type circuit interrupter is generally designated by the reference numeral 13. As shown in FIG. 3, the circuit interrupting device 13 generally comprises a stationary contact 23 having a stationary stem portion 23a, which is brazed to an upper end plate 25. Cooperable with the stationary contact 23, and separable therefrom to establish an arc, is a lower movable contact, generally designated by the reference numeral 27.

The movable contact 27 comprises a movable contact member, shown in the closed-circuit position, and attached to a movable stem portion 27a, the latter being sealed to the upper end of a sylphon metallic bellows 29. The lower end of the metallic bellows 29 is sealed within an opening 30 provided through the lower end plate 31 of the device 13. As well known by those skilled in the art, a suitable operating mechanism may be mechanically connected to the lower movable stem portion 27a to effect the actuation of the circuit-interrupting device 13, when utilized within operative equipment. The present invention, however, is not concerned with the intricacies of operation of the vacuum-type circuit interrupter 13, but specifically only with the sealing means for providing the outgassing procedures, and effecting the desired degree of evacuation with a final sealing operation, which constitutes the essence of the present invention.

In the particular type of device 13, which is utilized as an example of the present invention, it will be observed that a condensing shield 32, usually made of copper, or stainless steel, for example is used to condense metallic vapor during interruption. A plurality, such as three tabs 34a constitute an integral part of a flange ring 34, which is preferably made of a nickel-iron alloy, and generally comprising roughly 42 percent nickel and 58 percent iron; or the material could be "Kovar," which is a trademark of the Westinghouse Electric Corporation and consisting of 25–34 percent nickel, 4–17 percent cobalt, less than 1 percent manganese, and the balance iron. Consult U.S. Pat. Nos. 2,217,422; 1,872,354; and 1,942,261. The flange ring 34 may be made of a number of materials which match the expansion of the ceramic cylinders.

As illustrated in FIG. 3, it will be noted that generally, the envelope, generally designated by the reference numeral 21, comprises a pair of spaced ceramic sleeves 19, 20 disposed in alignment, and having their ends 19a, 20a, disposed in confronting relationship. As a prior operation, the confronting ends 19a, 20a, of the ceramic sleeves 19, 20 are first metallized with a suitable molybdenum-manganese formulation, which may be painted on by a brush, or applied by a silk-screen technique, as well known by those skilled in the art. Subsequent to the application of the moly-manganese formulation, the individual sleeves 19, 20 are fired at a temperature say 1,540° C. for 178 hours. As a later operation, the ends of the ceramic sleeves 19, 20 are painted with a grade "B" pure nickel powder in a vehicle by either a brush operation, or a silk-screen technique and the subsequent nickel coating is fired as a second firing operation for 800° for roughly 10 minutes and to 1,000° C. for approximately 5 minutes. Following these preliminariy metallizing steps, the ceramic sleeves 19, 20 are ready for the evacuation and sealing operation of the present invention.

Figure 5:
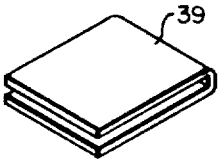
FIG. 5 is a perspective view of one of the brazing shims used in the present invention.

The component parts of the vacuum-type circuit interrupter 13 are placed into position, and a brazing ring or shim 37, made of a silver-copper eutectic alloy, sold under the trademark "BT" by many suppliers, one of which is the Handy and Harman Company located at 82 Fulton Street, New York City, is used between the ends 19a, 20a. This "BT" material, constituted by the aforesaid silver-copper eutectic alloy, flows at approximately 778° C. This "BT" material is used not only for the brazing rings or shims 37 of the present invention, as described hereinafter, but also for the U-shaped shims or tabs 39 which are illustrated in detail in FIG. 5 of the drawings.

Figure 2:
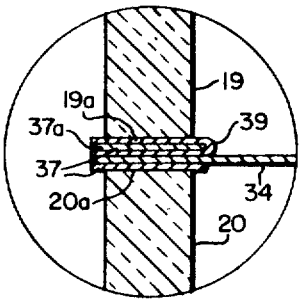
FIG. 2 is an enlarged fragmentary view of a portion of the joint existing between the confronting ends of the two insulating casings of the device illustrated in FIG. 1, taken at the circle "A" in FIG. 1.
Figure 6:
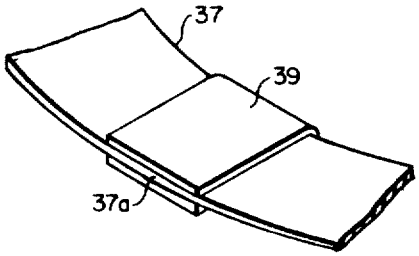
FIG. 6 is a perspective view of the positioning of one of the brazing shims encircling a portion of one of the annular brazing shims.

Returning to the assembly steps, a solder ring or shim 37 of the aforesaid "BT" material is placed against the metallized lower surface **19*a* of the upper ceramic sleeve 19. A plurality, such as three, or in certain instances a greater number, such as six, U-shaped brazing shims or tabs 39 of the same "BT" material are wrapped around a portion 37a of the brazing rings 37, as illustrated in FIGS. 2 and 6, and placed into position against the lower end 19a of the upper ceramic sleeve 19. Immediately below the brazing ring 37 is the supporting flange portion 34 of the condensing shield 3, which, as previously described, is made of "Kovar," or a nickel-iron material with the desired expansion characteristics. Then follows another brazing ring or shim 37, which is disposed below the flange 34 and immediately against the upper end surface 20a of the lower ceramic sleeve 20**. See FIG. 2 in this connection.

Additional brazing rings 37 made of the same "BT" material are disposed at the upper and lower metallized end surfaces 19b, 20b of the ceramic sleeves 19, 20 between the annular flanges 43, 44 of the end metallic plates 25, 31. The end metallic plates 25, 31 may, for example, be stainless steel, having "Kovar" or nickel-iron flange rings 43, 44, or the end plates 25, 31 may be made entirely of "Kovar" or nickel-iron material.

Figure 4:
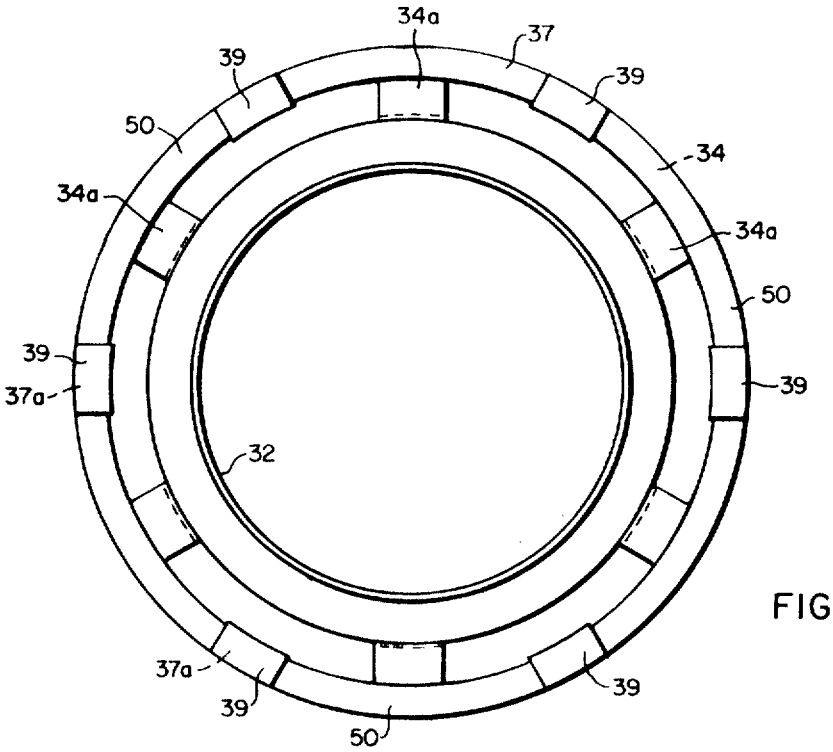
FIG. 4 is a top plan view, taken substantially along the line IV—IV of FIG. 3 illustrating the condenser shield and its support and eliminating the contact structure for clarity.

It will be observed that by utilizing a plurality of spaced brazing shims or tabs 39, there results a peripheral communcating passage 50 (FIG. 4) which may, for example, be 8 mils thick to permit thereby egress of the occluded gases, and other gaseous by-products, which are baked out of the metallic component parts of the vacuum-type circuit interrupter 13.

The vacuum furnace 1 is raised to a temperature below that of the 778° C. value, at which the "BT" shims 39 and brazing rings or shims 37 would melt, and at the temperature below this value 778° C. the outgassing procedures and evacuation steps are employed, as well known by those skilled in the art.

It is obvious that in the operation of a vacuum-type circuit interrupter 13, due to the heat of arcing, it is desirable to utilize as component parts interiorly of the envelope 21 metallic parts, which the occluded gases and other gaseous by-products removed therefrom. Also a relatively high vacuum, say $10^{-4}$ torr, is generally employed.

When the desired degree of evacuation and outgassing of the occluded gases has occurred, the temperature of the vacuum furnace 1 is quickly raised to a value above the 778° C. flowing temperature of the brazing shims 37 and 39, say, for example, 850° C. maximum. These will then, of course, flow together to provide a hermetic seal.

The differential expansion of the side rods 16 now act to compress the entire unit 13 to a closed position, and with the brazing alloy completely flowed, the furnace 1 is shut off.

By way of recapitulation, the operation of the furnace 1 would be as follows: There is a pre-pump down cycle for ½ to ¾ of an hour, to reduce the pressure to $10^{-5}$ torrs. The heat is then turned on the furnace by energizing the resistance coils 6, and the furnace attains a temperature of 650° C. for 2½ hours. Then occurs an outgassing step of 2½ hours to 3 hours at a temperature roughly 650° C. There then follows a 1 hour bake-out at 725° C. It will be noted that all during the aforesaid time, the temperature is below that of the melting point of the "BT" shims 39 and brazing shims 37.

Following the aforesaid procedures, the vacuum furnace is conducted through a brazing cycle for 25 minutes at 850° C. Then the furnace is gradually allowed to cool down, the sealing having been completed by the aforesaid rise of temperature to the 850° C. value.

There results a 2½ hour cool-down period for the parts to gradually assume ambient, or normal room temperature.

Generally, it take 7½ hours for the entire aforesaid procedure being conducted within the vacuum furnace 1.

From the aforesaid description, it will be apparent that no tubulation is required, and a free peripheral communicating passage 50 is provided between the two ceramic sleeves 19, 20 to permit the occluded gases to freely pass radially outwardly, and to be drawn through the vacuum pump 9 associated with the vacuum furnace 1.

Although the process of the present invention has been described with particular rerationship to a vacuum-type circuit interrupter 13, it will be obvious to those skilled in the art that the improved sealing method of the present invention may be applied to other vacuum-type devices, such as vacuum tubes, discharge tubes, or related equipment, in which bake-out operations and evacuation steps are desired.

Although there has been illustrated and described a specific process, it is to be clearly understood that the same was merely for the purpose of illustration, and that changes and modifications may readily be made therein by those skilled in the art, without departing from the spirit and scope of the invention.

I claim:

1. The method of evacuating and sealing an envelope comprising two axially-aligned ceramic sleeves, comprising the steps of:

(a) positioning a plurality of brazing shims at spaced points on a brazing ring;

(b) placing the aforesaid brazing ring with the assembled spaced brazing shims thereon between and in mating engagement with the confronting of the two-axially-aligned ceramic sleeves to provide a peripheral communicating passage to permit egress of gases during evacuation;

(c) placing the entire device within a vacuum furnace;

(d) performing usual outgassing and evacuation steps while maintaining the furnace temperature below the melting temperature of the spaced brazing shims;

(e) raising the furnace temperature to a temperature above the melting temperature of the brazing shims to cause flowing thereof into the brazing ring to seal the two axially-aligned sleeves together;

(f) reducing the temperature of the furnace; and, (g) removing the sealed evacuated device from the furnace.

2. The method of claim 1, wherein the shims and the brazing ring are formed of the same material.

3. The method of claim 2, wherein the material is a silver-copper eutectic alloy melting at approximately 778° C.

4. The method of claim 1, wherein the brazing shims are of U-shape and wrapped spatially about the brazing ring.

*5. The method of evacuating and sealing an envelope comprising a ceramic sleeve and a metallic member, comprising the steps of:*

*(a) positioning a plurality of brazing shims at spaced points on a brazing ring;*

*(b) placing the aforesaid brazing ring with the assembled spaced brazing shims thereon between and in mating engagement with the confronting surfaces of the ceramic sleeve and said metallic member to provide a peripheral communicating passage to permit egress of gases during evacuation;*

*(c) placing the entire device within a vacuum furnace;*

*(d) performing usual outgassing and evacuation steps while maintaining the furnace temperature below the melting temperature of the spaced brazing shims;*

*(e) raising the furnace temperature to a temperature above the melting temperature of the brazing shims to cause flowing thereof into the brazing ring to seal the ceramic sleeve and the metallic member together;*

*(f) reducing the temperature of the furnace; and,*

*(g) removing the sealed evacuated device from the furnace.*

*6. The method of claim 5, wherein the shims and the brazing ring are formed of the same material.*

*7. The method of claim 6, wherein the material is a silver-copper eutectic alloy melting at approximately 778° C.*

*8. The method of claim 5, wherein the brazing shims are of U-shape and wrapped spatially about the brazing ring.*

References Cited

The following references, cited by the Examiner, are of record in the patented file of this patent or the oringinal patent.

UNITED STATES PATENTS

| | | | |
|---|---|---|---|
| 2,647,218 | 7/1953 | Sorg et al. | 29—427.7 UX |
| 2,650,683 | 9/1953 | McPhee et al. | 287—189.365 |
| 2,709,147 | 5/1955 | Ziegler | 29—472.7 X |
| 2,857,663 | 10/1958 | Beggs | 29—473.1 |
| 3,069,766 | 12/1962 | Rush | 29—501 X |
| 3,088,201 | 5/1963 | Louden et al. | 29—501 X |
| 3,091,028 | 5/1963 | Westbrook et al. | 29—473.1 |
| 3,465,943 | 9/1969 | Clark et al. | 29—501 X |
| 3,479,170 | 11/1969 | Louden | 29—501 X |
| 3,487,536 | 1/1970 | Goldstein | 29—501 X |

J. SPENCER OVERHOLSER, Primary Examiner

R. J. SHORE, Assistant Examiner

U.S. Cl. X.R.

29—472.1, 473.1, 493, 494, 501; 287—189.365